United States Patent [19]
Newell et al.

[11] Patent Number: 5,390,323
[45] Date of Patent: Feb. 14, 1995

[54] MICROSTORE REFERENCE LOGGING

[75] Inventors: Linda Newell, Fremont; Matt Noel, Boulder Creek, both of Calif.

[73] Assignee: Amdahl Corporation, Sunnyvale, Calif.

[21] Appl. No.: 741,093

[22] Filed: Aug. 5, 1991

[51] Int. Cl.[6] .................. G06F 11/34; G06F 11/00
[52] U.S. Cl. .................... 395/575; 371/29.1
[58] Field of Search ............ 395/575; 371/19, 16.5, 371/29.1

[56] References Cited

U.S. PATENT DOCUMENTS

| | | | |
|---|---|---|---|
| 4,495,565 | 1/1985 | Thompson | 364/200 |
| 4,853,851 | 8/1989 | Horsch | 364/300 |
| 4,937,740 | 6/1990 | Agarwal | 364/200 |
| 5,051,944 | 9/1991 | Fetterolf et al. | 364/900 |
| 5,103,394 | 4/1992 | Blasciak | 395/575 |

*Primary Examiner*—Robert W. Beausoliel, Jr.
*Assistant Examiner*—Phillip Vales
*Attorney, Agent, or Firm*—Fliesler, Dubb, Meyer & Lovejoy; Gideon Gimlan

[57] ABSTRACT

The invention provides a method and apparatus for logging all references to microstore addresses irrespective of the number of times that a same address is referenced and irrespective of the order in which addresses are referenced. It provides a log indicating simply whether each address of the microstore has or has not been referenced within a prescribed time period. There is no limit placed on the duration of the prescribed time period and thus logging can cover long-term events such as, the full execution of a single macro-instruction, the full execution of an assembly level routine or the execution of all micro-instructions resident in the microstore as they are subjected to all possible input parameters. A practical tool for global visualization of computer operations is therefore provided.

7 Claims, 3 Drawing Sheets

MICROSTORE REFERENCE LOGGING

BACKGROUND OF THE INVENTION

1. Field of the Invention

The invention generally relates to the debugging of programs in digital computers. The invention more specifically relates to on-line debugging of tightly-packed microcode in the microstore of a digital computer.

2. Cross Reference to Related Copending Applications

The present application is related to copending U.S. patent application Ser. No. 07/670,289 entitled "SCANNABLE SYSTEM WITH ADDRESSABLE SCAN RESET GROUPS", by Robert Edwards et al, which was filed Mar. 15, 1991 and issued as U.S. Pat. No. 5,271,019 on Dec. 14, 1993. Said copending application is assigned to the assignee of the present application and its disclosure is incorporated herein by reference.

CROSS REFERENCE TO RELATED PATENTS

The following U.S. Patents are assigned to the assignee of the present application and are further incorporated herein by reference: (A) U.S. Pat. No. 3,840,861, DATA PROCESSING SYSTEM HAVING AN INSTRUCTION PIPELINE FOR CONCURRENTLY PROCESSING A PLURALITY OF INSTRUCTIONS, issued to Amdahl et al, Oct. 8, 1974; (B) PROGRAM EVENT RECORDER AND DATA PROCESSING SYSTEM, U.S. Pat. No. 3,931,611, issued to Grant et al, Jan. 6, 1976; (C) U.S. Pat. No. 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981; (D) U.S. Pat. No. 4,661,953, ERROR TRACKING APPARATUS IN A DATA PROCESSING SYSTEM, issued to Venkatesh et al, Apr. 28, 1987; (E) U.S. Pat. No. 4,685,058, TWO-STAGE PIPELINED EXECUTION UNIT AND CONTROL STORES, issued to Lee et al, Aug. 4, 1987; (F) U.S. Pat. No. 4,752,907, INTEGRATED CIRCUIT SCANNING APPARATUS HAVING SCANNING DATA LINES FOR CONNECTING SELECTED DATA LOCATIONS TO AN I/O TERMINAL, issued to Si, et al. Jun. 21, 1988; (G) U.S. Pat. No. 4,802,088, METHOD AND APPARATUS FOR PERFORMING A PSEUDO BRANCH IN A MICROWORD CONTROLLED COMPUTER SYSTEM, issued to Rawlinson et al, Jan. 31, 1989; (H) U.S. Pat. No. 4,819,166, MULTI-MODE SCAN APPARATUS, issued to Si et al Apr. 4, 1989; and (I) U.S. Pat. No. 4,855,947, MICROPROGRAMMABLE PIPELINE INTERLOCKS BASED ON THE VALIDITY OF PIPELINE STATES, issued to Zmyslowski et al, Aug. 8, 1989.

DESCRIPTION OF THE RELATED ART

Computer programs are typically constructed using a bottom-to-top hierarchy of micro-instructions, macro-instructions and assembly level routines. A micro-instruction is a parallel set of bits which control operations in a digital computer at a relatively elemental level. A series of micro-instructions can be combined to define a micro-routine and one or more such micro-routines can be used to define a higher-level macro-instruction. Different macro-instructions can then be combined to implement higher-level assembly-level operations. The term, microcode, is used here to refer to a collection of digital words including micro-instructions and micro-routines.

Mainframe computers typically store the microcode which controls their operations in a microstore portion of their memory system. The microstore is often constructed with just a few high-speed random access memory (RAM) devices and/or a few read-only memory (ROM) devices. Each device has a relatively small storage capacity (e.g., for holding between 1K to 10K of micro-instructions; 1K being equal to 1024) and thus memory space is at a premium.

Optimal performance is realized by compressing microcode into the microstore so as to make good use of every last available location. Code re-use techniques such as subroutine calls and program loops are often employed to minimize the average microstore space consumed by any one macro-instruction. Ideally, the microcode is packed tightly in all low-level and high-level micro-routines so as to maximize the total number of macro-instructions residing together within the limited space of the microstore. The tightly-packed code is preferably further optimized so that every macro-instruction executes in minimal time.

Creating such tightly-packed speed-optimized microcode is not easy. Numerous types of programming errors and/or inefficiencies can come into being during microcode development. In execution, some microcode errors/inefficiencies may arise from or produce corresponding hardware errors and/or inefficiencies. Every error and/or inefficiencies should be recognized and its underlying cause should be isolated and eliminated, where possible, regardless of whether the error is software-produced or hardware-produced or results from the combined interactions of software and hardware.

The term "imperfection" will be used here to collectively describe microcode-related software and/or hardware errors and/or inefficiencies.

A first kind of microcode-related imperfection comes about when an error-infected branch operation passes control to a random microstore location rather than to an intended location. (Infection can arise from software or hardware origins.) The corresponding micro-routine will typically crash by disappearing into an endless loop somewhere in memory. The occurrence of this type of error-infected branch is easily recognized because operations of the related macro-instruction never complete. If the address boundaries of the endless loop are ascertained, it may be possible to determine in a second run of the micro-routine when and how the computer branches erroneously from its intended address space into the address space of the endless loop.

Not all microcode-related imperfections are easily recognized. A more troublesome second kind of error microcode-related imperfection comes about when an error-infected micro-routine branches into a benign but nonetheless time-consuming section of microcode and then returns to a main section to continue with intended operations. The expected operations of the corresponding macro-instruction complete, but not in minimal time.

A third type of microcode-related imperfection comes about when an branch-on-condition always skips over one small section of microcode that should execute if the programmer's expectations are to be met. The conditional branch passes control to numerous other sections of microcode but somehow always seems to miss the one small section. This is because a condition which the programmer expected, never occurs or because a condition which the programmer never expected, does occur.

A fourth type of microcode-related imperfection comes about when the microstore is used to hold a piece of microcode that is never accessed by any of its resident macro-instructions. Memory space consumed by the never-accessed piece of microcode might be more advantageously used to add a new macro-instruction to the macro-instruction repertoire of the microstore or to enhance an existing macro-instruction and thus the never-used microcode constitutes an inefficiency.

While it is easy to comprehend how the above-described first through fourth microcode-related imperfections come about in theory, it is often difficult in practice to detect the presence of some of these imperfections and/or to determine what area of microcode address space is infected by such imperfections and/or to visualize the impact of these imperfections on overall system performance.

With regard to the first kind of microcode-related imperfection (erroneously branching into an undesired area of the microcode address space), the outer bounds of the branched-into area may be difficult to ascertain, particularly if a very long endless loop ensues. It may be helpful to know that an undesired area of the microcode address space is entered into from more than one branch point so that all errors which produce a branch into the area can be uncovered at once. But first, the outer bounds of the undesired address area have to be ascertained.

With regard to the second kind of microcode-related imperfection (straying in and out of benign code), usually there is no guideline pre-established at the time of microcode development for determining that a macro-instruction is executing in more than minimal time. The benign strayed-into code may be so small relative to the rest of the micro-routine that conventional debug tools fail to uncover it. And if only the end state of the machine is inspected, the conclusion will be that everything has gone well because the micro-routine produces the desired end results.

With regard to the third type of microcode-related imperfection (always-skipped code), it may be that the always-skipped code handles a rare situation and its omission is not noticed during normal microcode testing procedures.

With regard to the fourth type of microcode-related imperfection (never-used microcode), the source code of the corresponding macro-instructions may be written in such a way that the never-accessed piece of microcode appears to be accessed numerous times by the micro-routines of many different macro-instructions although in practice, it never really is.

Single step tracing is one technique commonly used in attempts to debug microcode. The technique produces a list or "snapshot" of the last N microstore addresses which have been most recently referenced in the computer (hereafter "trace list").

N is a finite integer which represents either the physical or practical storage limits of the recording medium on which the trace list is recorded. Every recording medium has practical limits to its storage capacity and/or recording speed. If a high-speed static RAM is used for recording the trace list, then the single-step tracing process can proceed rapidly. But the storage capacity of high-speed RAM is usually small (because of cost considerations) and it therefore accommodates no more than, say $N=2048$ records.

Magnetic disks or tapes can usually hold many more records of information ($N>>2048$) but the data-recording speed of such larger capacity media is much slower. In many instances (e.g., on-line debugging) a high-speed low-capacity RAM is preferred for recording the trace list because recording directly to a slower magnetic disk or tape is not practical.

Single step tracing works as follows. Every time the computer accesses (references) a location in its microstore, the address of that location is blindly appended to the trace list. The process continues until the predefined storage limit, N, is encountered. The resulting trace list then provides a history of all accesses made to the memory locations of the microstore in the last N machine cycles.

It is important to note that the predefined storage limit, N, works to constrain the temporal reach of the trace list. A single-step trace list does not indicate what microstore references occurred outside a time span corresponding to N sequential cycles. This can present a significant problem when the error to be captured occurs rather infrequently (e.g., once per hour or once per day). Multiple snapshots could be taken, but one may have to wait an excessively long time before the infrequent error falls by luck within the N-cycle time window of a single-step trace list.

If an error-infected branch operation leaves the computer cycling endlessly in a short inner-loop of addresses, and the inner-loop happens to have a cycle length much less than N, it is relatively easy to recognize that the computer is caught in such a loop from an N-cycle long trace list and to determine the outer bounds of this loop.

On the other hand, if an error-infected branch operation puts the computer into a state where it is caught in an outer-loop having a cycle length much greater than N, the trace list may fail to reveal this aspect of the computer's behavior. A trace list cannot show behavior extending outside of its N-cycle window.

The inability of single-step tracing to capture and display behavior that extends over more than N cycles is a major weakness of the method. Taking multiple snapshots does not cure the weakness because there are many situations where the cause of error is a relatively infrequent and/or nondeterministic event.

Another major weakness of single-step tracing comes to light when the micro-routine under investigation contains a highly-repetitious (but not necessarily endless) loop which includes multiple calls to small subroutines. The same addresses show up in the trace list, over and over again, thereby quickly filling up all of the N record slots available in the trace list. Visualization of the computer's behavior is then restricted not only to the already-mentioned temporal window of N cycles but also to a geographic window which covers far fewer than N microstore addresses. The number of unique addresses which show up in a repetition-saturated trace list is usually well below N.

A trace list which captures a redundant outpour of time-restricted and address-bound data does rarely provides much useful information for debugging microcode. Such a trace list may provide a microscopic view of some operations taking place during the execution of a macro-instruction but it fails to provide the grand view. It doesn't indicate the nature of all operations invoked by the execution of relatively long micro-routines. It doesn't capture the overall character of the computer's behavior as many or all of the macro-instructions resident in the microstore execute together.

To borrow from a popular cliche, the problem is that single-step trace lists provide snapshots of small clusters of microstore references (trees) but in so doing they obscure the totality of the forest (the computer's overall behavior).

A method is needed for quickly visualizing global aspects of a computer's behavior in one simple picture and particularly for uncovering globally-extending variations of the above-mentioned first through fourth types of microcode-related imperfections.

SUMMARY OF THE INVENTION

The invention overcomes the above-mentioned problems by providing a method and apparatus for logging all references to microstore addresses irrespective of the number of times that a same address is referenced and irrespective of the order in which addresses are referenced. It provides a log indicating simply whether each address of the microstore has or has not been referenced within a prescribed time period.

There is no limit placed on the duration of the prescribed time period. The microstore reference log can cover the execution of micro-routines of any duration including those invoked in the execution of a full macro-instruction, those invoked in the execution of a full assembly level routine or those invoked in the execution of all macro-instructions resident in the microstore. A practical, unrestricted tool is provided for global visualization of microstore referencing operations.

A method in accordance with the invention comprises the steps of: (a) providing a plurality of M log bits each corresponding to one of the memory locations in a microstore having M memory locations; (b) clearing the M log bits by placing each in a first state; (c) setting each log bit to a second state if its corresponding microstore location is referenced during a test period; and (d) after the test period, reviewing the M log bits to determine whether one or more microstore locations which should not have been referenced was referenced and/or to determine whether one or more microstore locations which should have been referenced was not referenced.

An apparatus in accordance with the invention comprises: (a) a log memory having at least a plurality of M log bits each corresponding to one of the memory locations in a microstore having M memory locations; (b) clearing means for clearing the M log bits by placing each in a first state; (c) setting means for setting each log bit to a second state if its corresponding microstore location is referenced during a test period; and (d) reviewing means for reviewing the M log bits after the test period, to determine whether one or more microstore locations which should not have been referenced was referenced and/or to determine whether one or more microstore locations which should have been referenced was not referenced.

One contemplated use for the above method and apparatus is to execute all of the macro-instructions resident within a microstore while subjecting the computer to all conceivable input parameters and to then search the M log bits for one or more still-cleared bits. These still-cleared bits correspond to never-used microcode and thus flush out the fourth error type mentioned above. Once such unused microcode is identified, it can be replaced with more useful code such as code which implements an additional macro-instruction in the microstore. Microstore utilization efficiency is then improved.

A second contemplated use for the above method and apparatus is to execute one resident macro-instruction of the microstore over and over while subjecting the computer to all conceivable input parameters. The reference log is then scanned for all set bits. These set bits will map out all microstore locations of the microstore address space which were actually referenced by the repeatedly executed macro-instruction.

Next, a second map indicating all microstore locations expected to be referenced by the executed macro-instruction is compared against the reference log map to detect all microstore address regions which should not have been referenced during execution of the macro-instruction but were nonetheless referenced and/or to detect all microstore address regions which should have been referenced but for some reason were not referenced. Typically, these map differences correspond respectively to the erroneously-branched-into microcode of the first and second error types mentioned above and to the always-skipped microcode of the third error type mentioned above.

A third contemplated use for the above method and apparatus is to compare the global behavior of microstore fetches invoked by slightly different yet generally similar macro-instructions. A reference log for each of these macro-instructions is obtained and the plural logs are compared. The areas of difference may be used to pinpoint microcode which should or should not have been executed in one of the macro-instructions.

A fourth contemplated use is to compare the reference logs of multiple executions of a same macro-instruction where each execution is subject to different input parameters.

Other features of the invention will become apparent from the below detailed description.

DETAILED DESCRIPTION

Figure 1:
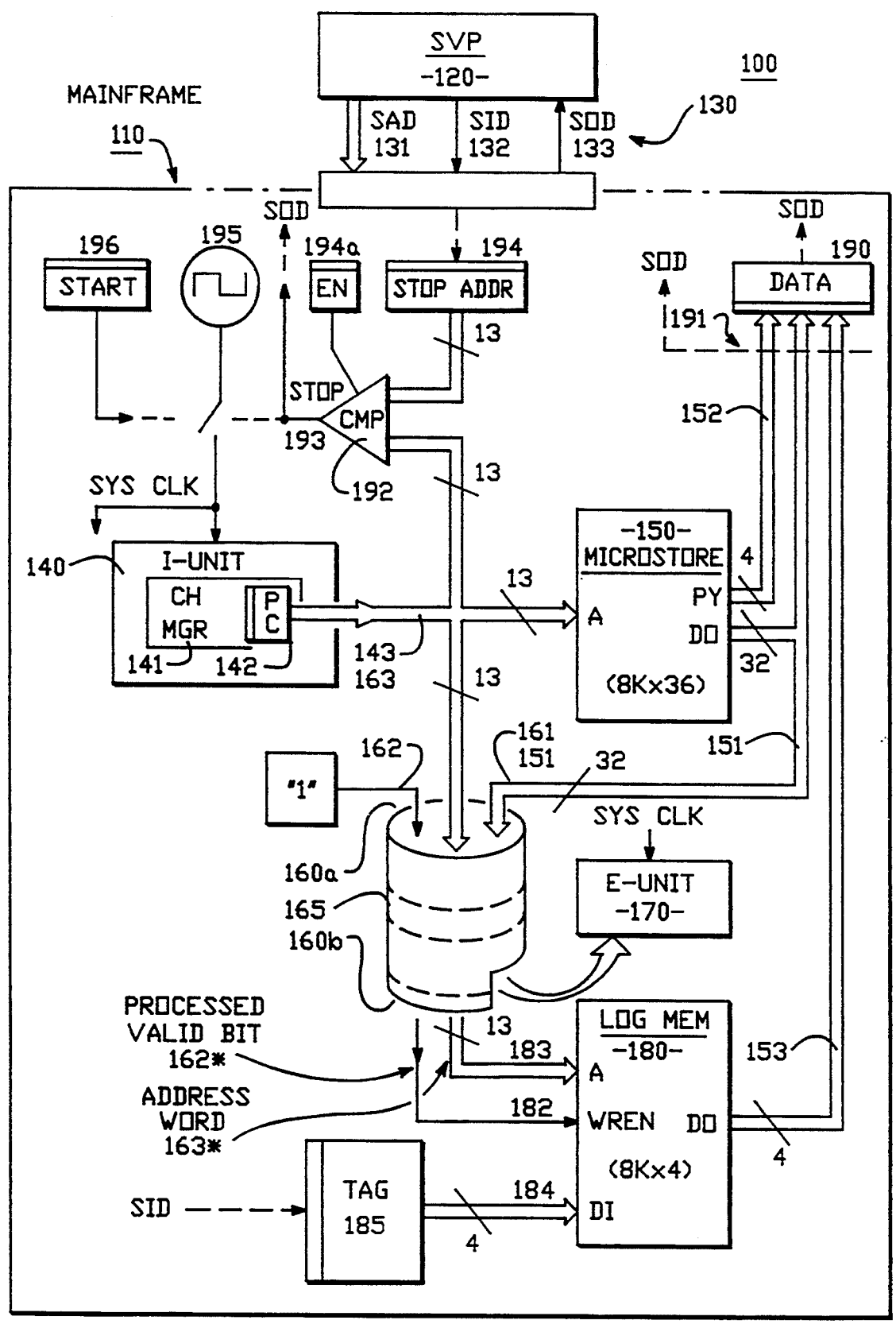
FIG. 1 is a block diagram of a micro-store reference logging apparatus in accordance with the invention.

Referring to FIG. 1, a microstore reference logging apparatus 100 in accordance with the invention is incorporated within a two-computer system comprising a mainframe computer (MF) 110 and a service processor (SVP) 120.

Service processor 120 is clocked and powered independently of the mainframe computer 110 and programmed to monitor and control various subcomponents of the mainframe computer 110. The service processor (SVP) 120 connects to a large number of prespecified monitor points (e.g., 191, 193, not all individually shown) within the mainframe (MF) 110 and to a large number of scannable latches (e.g., 194a, not all individually shown) within the mainframe 110 by way of a scan bus 130. Scan bus 130 carries scan address data (SAD) 131 from the SVP 120 to the MF 110 for addressing each of the prespecified monitor points or scan latches within the mainframe 110. The scan bus 130 also carries scan input data (SID) 132 from the SVP 120 to the MF 110 for setting or resetting desired bits in addressed ones of the scan latches within the mainframe 110. And the scan bus 130 further carries scan output data (SOD) 133 representing the states of addressed ones of the monitor points within the mainframe 110 from the MF 110 to the SVP 120.

The SVP 120 can observe the states of all monitor points within the mainframe at any time, irrespective of whether the mainframe clocks are running or not. This is done by addressing each monitor point over the scan bus (using SAD 131) and collecting returned scan output data, SOD 133, over a return path which returns monitor point levels to the SVP independently of whether the mainframe clocks are on or off.

Certain of the scan latches (clocked scan latches) within the mainframe 110 can be controlled by the SVP only when the delivery of system clock pulses (195) to such scan latches is suppressed. Others of the mainframe scan latches (Operating State Latches or OSL's for short) are nonclocked and can be set or reset by the SVP 120 even while mainframe system clocks are running.

Further details about the scan system may be found in the above cited U.S. patent application Ser. No. 07/670,289 entitled "SCANNABLE SYSTEM WITH ADDRESSABLE SCAN RESET GROUPS", by Robert Edwards et al, which is incorporated herein by reference.

The mainframe computer 110 has a synchronous pipelined architecture which includes an instruction fetching unit (I-unit) 140, a high-speed microstore 150, an instruction-queueing pipeline 160 and an execution unit (E-unit) 170. Instruction fetch and execute cycles are preferably as short as possible. Data moves through the pipeline 160 at a relatively quick pace. In a silicon-based, emitter coupled logic (ECL) implementation of the mainframe 110, the E-unit and I-unit cycle lengths are preferably less than 10 nanoseconds long and in one specific embodiment they are 7 nanoseconds long.

A channel managing portion 141 of the instruction unit (I-unit) includes a program counter (PC) 142 for supplying 13-bit address words 163 over address bus 143 to an address input port (A) of the microstore memory unit 150. Microstore unit 150 has an 8K×36-bit organization where each 36-bit word comprises a 32-bit microcode field and a 4-bit parity field.

A set of high-speed RAM and/or ROM integrated circuit (IC) chips may be used to implement the microstore 150. In one embodiment, five Fujitsu MB78K static RAM chips are used. Four of MB78K chips are each configured as an 8K×8-bit device while the fifth chip is configured as two 8K×4-bit devices. One of the 8K×4-bit devices in the fifth chip supports the 4-bit parity field of microstore 150 while the other 8K×4-bit device defines a microstore reference logging memory 180 which will be described more fully below.

When a microcode field is addressed by PC 142, the field is output as a 32-bit microcode word 161 on data bus 151 and transmitted over bus 151 to a head-end portion 160a of the pipeline 160. The head-end 160a receives the microcode word 161 (bus 151) together with its corresponding address word 163 (bus 143). The head-end 160a of the pipeline also receives a valid bit 162 which shifts down through shift register stages 165 of the pipeline 160 in unison with the microcode word 161 and address word 163. Each valid bit 162 is initially-preset to true (logic "1") when it enters the pipeline 160 together with a corresponding microcode word 161. In traveling through the pipeline 160, the companion valid bits 162 of some microwords 161 are reset to false (logic "0") to indicate that the microword 161 is to be ignored by the execution unit 170 because of a branch condition or an error condition or some other reason. Valid microcode words 161 are consumed by the execution unit 170. Invalid microcode words are discarded. The microstore location of a consumed microcode word is said to be "referenced" while that of a discarded microcode word is not referenced.

The pipeline-processed valid bit 162* which emerges from a tail end 160b of the pipeline 160 is accompanied by the 13-bit address word 163* of its corresponding microcode word. Line 182 carries the processed valid bit 162* to a write-enable input (WREN) of the reference logging memory 180 (hereafter also referred to as the log memory 180). Bus 183 carries the corresponding 13-bit address word 163* to an address input port (A) of log memory 180. Bus 184 supplies a predefined 4-bit tag code (e.g., $A_{hex}$ or "1010" in binary) from a scannable tag register 185 to a data input port (DI) of log memory 180. The write time of the log memory 180 should be less than or substantially equal to the read time of the microstore 150. If the processed valid bit 162* is true, the tag code of register 185 is written into the location of log memory 180 that is pointed to by the accompanying address signal 163*. If the processed valid bit 162* is false, the tag code of register 185 is not written into the log memory 180 for that cycle.

The log memory 180 is preferably an 8K×4-bit high-speed static RAM as earlier mentioned. Its output data (DO) is transmitted over a 4-bit wide log-out bus 153 for collection by a log data collecting register 190. Data register 190 also receives the four parity bits from microstore 150 over bus 152 and the 32-bit microfield bits from bus 151. Scan monitor points 191 are defined at the inputs and/or outputs of data register 190 to allow the SVP 120 to monitor and scan out the data present on buses 151–153.

The mainframe computer 110 includes an address comparing unit 192 which compares program count address signals 163 on bus 143 against a predefined stop address held in a stop register 194. Stop register 194 includes a comparator enable latch 194a for selectively enabling or disabling comparing unit 192. All latches of register 194, including 194a, are preloaded with data from the SVP during a system initialization step. If comparing unit 192 is enabled and an address match is later found while the mainframe clocks 195 are running, the comparing unit 192 sends a stop command over stop line 193 to all the mainframe clocks 195 to thereby temporarily halt all synchronous operations in the mainframe 110.

The SVP 120 continuously polls the stop command line 193 and services each occurrence of a mainframe clock stoppage by scanning out data held in the mainframe 110 at the time of clock stoppage. The service processor 120 later restarts the mainframe clocks 195 by way of a clock control register 196. Control register 196 also lets the SVP stop the mainframe clocks 195 on its own accord.

While mainframe clocks 195 are stopped (shut off), the service processor 120 can address all clocked scan registers of the mainframe 110 to set or reset the bits of these registers as desired. It uses address-generating ones of these registers (i.e., PC 142 and the tail-end stage of pipeline 160) to generate address signals and it uses point monitoring facilities at the data output ports (DO) of the memories to scan out the internal contents of memory units 150 and 180. The SVP 120 then analyzes the scanned out data or relays it to another computer (not shown) for analysis.

Figure 2:
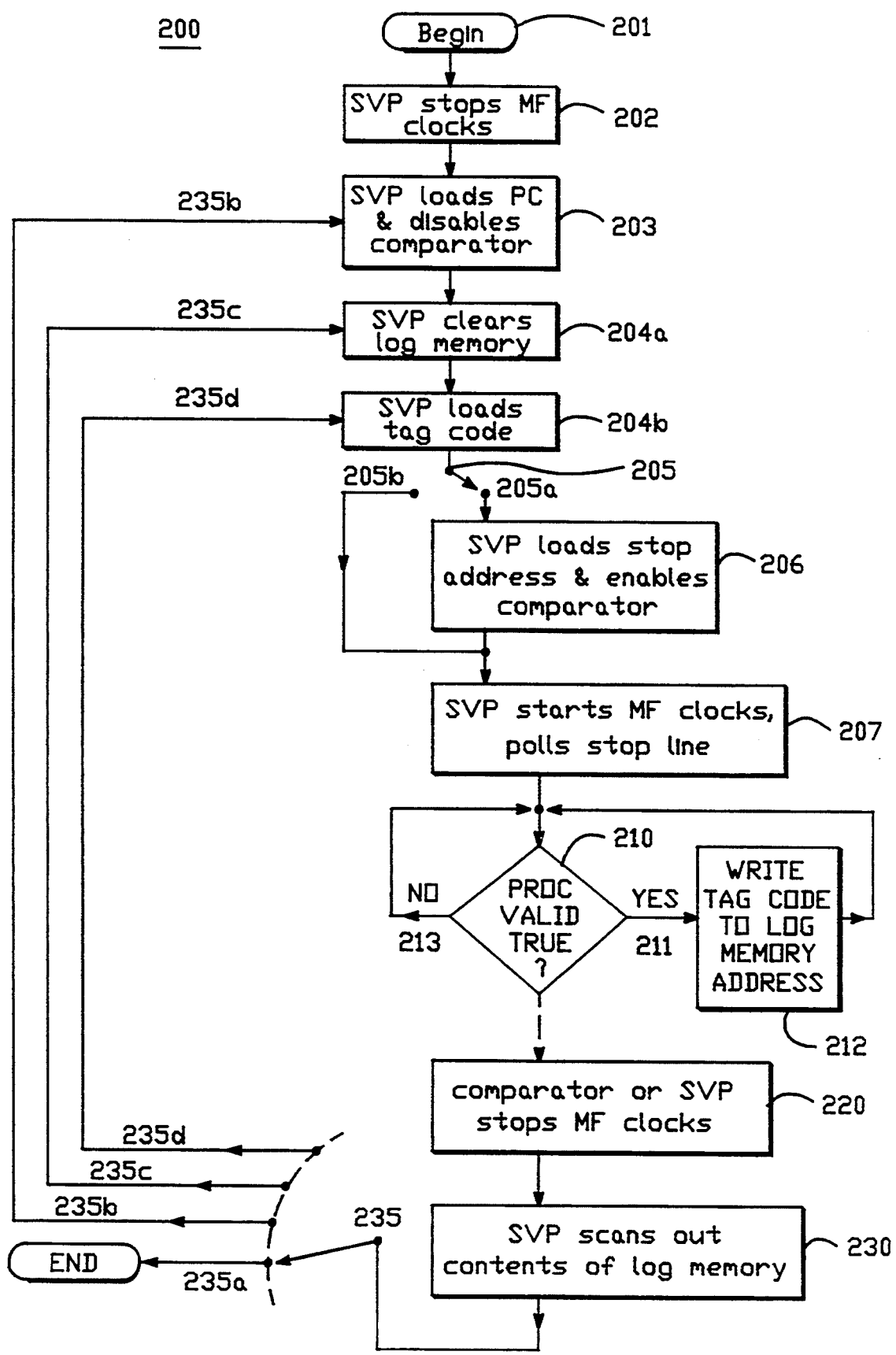
FIG. 2 is a flow chart of operations carried out by the micro-store reference logging apparatus of FIG. 1.

FIG. 2 flowcharts the operations of the reference logging apparatus 100. A debug run 200 begins at step 201. At step 202, the service processor 120 stops the mainframe clocks 195. At step 203, the service processor loads a desired micro-routine start address into program counter 142. The SVP 120 also disables comparing unit 192 at step 203.

At step 204a, the service processor 120 clears the log memory 180 by writing all zeros ("0000") or all ones ("1111") into all address locations of the log memory 180 and at following step 204b the SVP loads a different tag code (e.g., "1010" or "0101") into tag register 185.

Path switch 205 is preset to select one of two subsequent paths. If a first path 205a is selected, the SVP 120 next loads a desired stop address into stop register 194 and enables the comparing unit 192 at step 206. If alternate path 205b is selected, step 206 is bypassed and the debug run 200 proceeds to step 207 where the SVP 120 restarts the mainframe clocks 195.

Once the mainframe system clocks 195 are restarted, channel manager 141 begins to fetch microcode words 161 from microstore 150 and to load them into the head-end 160a of pipeline 160. Execution unit 170 begins to execute valid ones of the micro-instructions moving through the pipeline and to consume related other microcode words 161 if any.

Flowchart step 210 indicates the hardware operations taking place at the log memory 180 as processed valid bits 162* and accompanying address words 163* flow out of the pipeline tail-end 160b. Each pipeline-processed valid bit 162* output from the pipeline 160 determines whether or not the tag code in register 185 will be written (overwritten) into locations of log memory 180 which are concurrently addressed by the corresponding pipeline address signal 163*. If a validated address 163* exits pipeline 160 on bus 183, then flow chart path 211 is followed and the tag code of register 185 is written into log memory 180 (step 211). This is done irrespective of how many times before the same log word has been written into the same location. If the exit address 163* is not validated, then flowchart path 213 is followed and execution returns back to step 210 for testing the next valid bit 162*.

The loops formed by steps 210-211-212 or 210-213 repeat until mainframe clocks 195 are halted at step 220 either by the SVP 120 or by the action of comparing unit 192. The SVP 120 detects the clock stoppage at step 230 and scans out the contents of log memory 180. The contents of the log memory 180 can be analyzed immediately within the SVP or stored into a disk file for later analysis by the SVP 120 or another computer (not shown). Of importance, the size of log memory 180 does not place any limits on how long the debug run 200 cycles in loops 210-211-212 or 210-213.

After the logout step 230, another preset path selecting switch 235 determines the remaining flow of the debug run 200. If path 235a is selected, the debug run next ends at step 240. The SVP 120 can optionally disable the comparator 192 as it exits through step 240 and restart the mainframe clocks 195 so that Other tasks in the mainframe 110 will continue.

If path 235b is selected, the debug process returns to step 203 where the SVP 120 loads the program counter 142 with a new start address and then clears the log memory at step 204a to begin logging a new microstore reference pattern into memory 180. If path 235c is selected, the program counter 142 remains where last stopped but the SVP 120 clears the log memory at step 204a to again begin recording a new reference pattern in the log memory 180. If step 235d is selected, the log memory is not cleared and the debug run flows to step 204b so that it can continue to log further references to the log memory 180. The SVP can optionally switch to a new tag code at this time. If the tag code was "1010" prior to stoppage step 220, the SVP might switch to a new tag code such as "0101" at step 204b so that the log memory 180 will now begin to accumulate the new tag code ($5_{hex}$) on top of the previously held tag code ($A_{hex}$). At a next clock stoppage (step 220), the log memory 180 may be found to contain multiple tag codes each representing one or more references made before-/after different stoppage points.

Figure 3A:
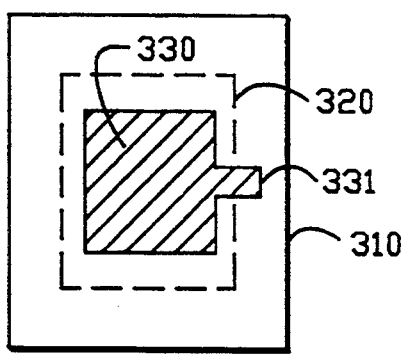
FIGS. 3A–3D illustrate reference patterns generated in the log memory under different conditions.

FIG. 3A illustrates a first log pattern which may be formed in log memory 180. The address space of memory 180 is represented by outer rectangle 310. The expected address domain of a micro-routine under test is illustrated by dashed rectangle 320 inside of outer boundary 310. The log memory locations which actually get tagged with the tag code (185) during a test run are represented by shaded region 330. As seen, shaded region 330 includes a projection 331 which extends beyond the expected domain 320. This indicates that the micro-routine under test is executing unexpected code in the out-of-domain address area corresponding to projection 331.

Figure 3B:
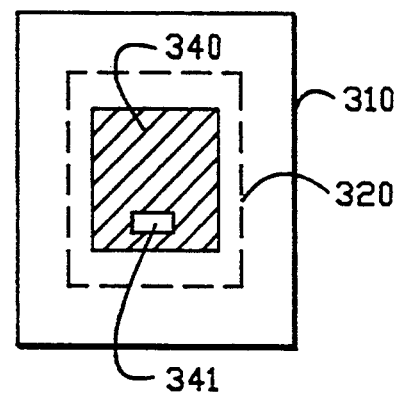

Referring to FIG. 3B, another scenario is shown. Outer rectangle 310 again represents the address space of log memory 180 and dashed inner rectangle 320 represents the expected domain of the micro-routine under test. Shaded region 340 indicates the log memory locations which were actually tagged during a test run. As seen, a nonshaded hole 341 in region 340 indicates that a piece of microcode within the expected domain 320 is being bypassed for some reason.

Figure 3C:
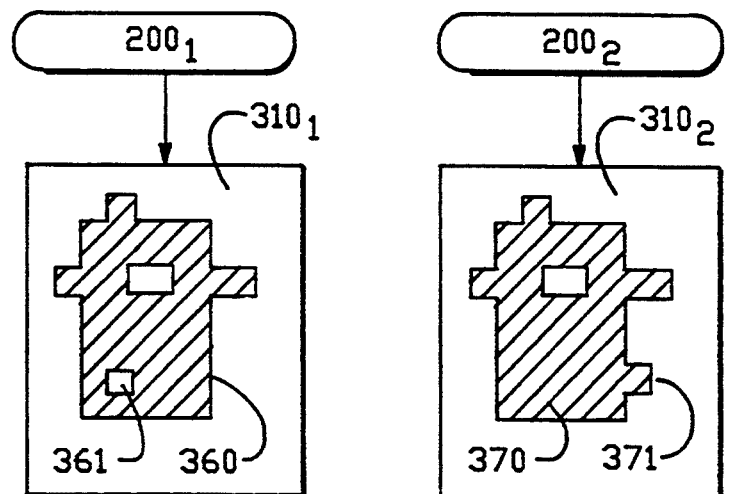
Figure 3C:
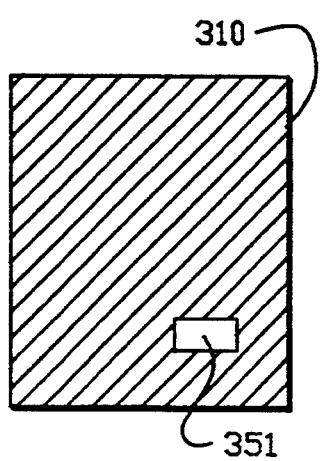

FIG. 3C illustrates a similar situation for a more global type of test. All macro instructions within the microstore 150 have been executed and the resulting pattern in log memory 180 is now inspected. A hole 351 in the generated tag pattern indicates that a corresponding area of microstore 150 is not being used by any of the macro instructions.

Figure 3D:
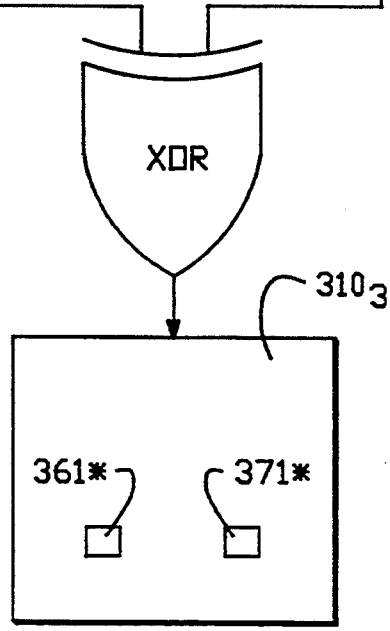

FIG. 3D shows another use for reference log patterns. Outer rectangle $310_1$ represents the address space of log memory 180 after a first debug run $200_1$. Outer rectangle $310_2$ represents the address space of log memory 180 after a second debug run $200_2$. The tagged region 360 of the first debug run $200_1$ is close in shape to the tagged region 370 of the second debug run $200_2$ except that region 360 has a relatively small hole 361 not found in region 370 and region 370 has a relatively small projection 371 not found in region 360. If an exclusive OR operation (XOR) is performed with log patterns $310_1$ and $310_2$ as inputs, these small differences will be flushed out as exceptions 361* and 371* in the resultant third pattern $310_3$.

The meaning of the resultant third pattern $310_3$ will depend on the nature of the first and second debug runs, $200_1$ and $200_2$. If the same macro-instruction was executed in debug runs $200_1$ and $200_2$ but subjected to slightly different input conditions in the respective runs, the tagged regions 361* and 371* of the XOR output pattern $310_3$ represent the different microcode fetches made under these different conditions. Closer investigation of the code in these regions (with the aid of single-step tracing if needed) may reveal that unnecessary code (371) was executed in the second run $200_2$ or that a necessary piece of code (361) was somehow skipped in the first run $200_1$.

If different first and second macro-instructions are respectively executed in first and second debug runs $200_1$ and $200_2$, and both subjected to all conceivable input parameters, the tagged regions of the XOR output pattern $310_3$ represent the different microcode fetches made by these different macro-instructions under similar input conditions. Closer investigation of the code in these regions (with the aid of single-step tracing if needed) may reveal that unnecessary code (371) was included in the second macro-instruction or that a necessary piece of code (361) was somehow skipped in the first macro-instruction.

The above disclosure is to be taken as illustrative of the invention, not as limiting its scope or spirit. Numerous modifications and variations will become apparent to those skilled in the art after studying the above disclosure.

By way of example, comparing unit 192 can be modified so it issues a clock stop command 193 when either the address word 163 output from PC 142 or the address word 163* output from the pipeline is inside or outside of one or more prespecified ranges. A clock down-counter could be further included in the mainframe to issue a clock stop command 193 at a precise number of cycles after clocks are started. Tag register 185 could be modified into a counter which outputs non-clear tag codes that change over a debug run in response to prespecified events such as specific address words appearing on bus 183 or specific timings of the system clocks 195.

Given the above disclosure of general concepts and specific embodiments, the scope of protection sought is to be defined by the following claims.

What is claimed is:

1. A reference logging apparatus for logging references made by a microcode-processor to microcode stored in a microstore having M memory locations, the apparatus comprising:
   (a) a log memory having at least a plurality of M bits each corresponding to one of the M memory locations in the microstore;
   (b) clearing means, operatively coupled to the log memory, for clearing the M bits of the log memory by placing each said bit in a first state; and
   (c) setting means, operatively coupled to the log memory and to the microcode-processor, for setting each log memory bit to a second state if the microcode of a corresponding microstore location is referenced by the microcode-processor during a test period;
   wherein:
   said microcode-processor includes an execution unit in a first computer and a pipeline for supplying microcode data words to the execution unit, said first computer having a system clock for synchronizing operations of the first computer, said pipeline having means for selectively invalidating one or more of the supplied microcode data words, said execution unit having means for selectively consuming only valid ones of the supplied microcode data words, said consumption constituting a reference by the microcode processor to the valid microcode data words;
   the microstore receives microcode address words and supplies corresponding microcode data words from addressed ones of its M memory locations to a head-end of the pipeline for possible later consumption by the execution unit;
   the microcode data words are shifted into the pipeline head-end in synchronism with the system clock of the first computer;
   each microcode data word is accompanied by a pipeline-alterable valid bit as the microcode data word shifts through and is processed in the pipeline,
   upon emergence from a tail-end of the pipeline, each pipeline-processed microcode data word continues to have an associated, pipeline-processed valid bit, the state of the pipeline-processed valid bit indicating whether the associated microcode data word is or is not consumable by the execution unit; and
   the reference logging apparatus further comprises:
      address linking means for linking each microcode address word to the valid bit of its corresponding pipeline-processed microcode data word as the valid bit shifts through the pipeline; and
      address discriminating means for discriminating between pipeline-processed microcode address words that are each linked to a pipeline-processed valid bit having a true final pipeline-processed state which indicates the corresponding pipeline-processed microcode data word is consumable by the execution unit and pipeline-processed microcode address words that are each linked to a pipeline-processed valid bit having a false final pipeline-processed state which indicates the corresponding pipeline-processed microcode data word is not consumable by the execution unit.

2. A reference logging apparatus according to claim 1, wherein:
   the log memory receives pipelined microcode address words from the tail-end of the pipeline, each pipelined microcode address word being linked to its corresponding pipeline-processed valid bit; and
   the setting means defines a microcode data word of a microstore location as having been referenced only if the pipeline-processed valid bit of the pipelined microcode address word currently received by the log memory has a true final pipeline-processed state.

3. A method for logging references made by a microcode-processor to microcode stored in a microstore having M memory locations, the method comprising the steps of:
   (a) providing a log memory having plurality of M log bits each corresponding to one of the M memory locations in said microstore;
   (b) clearing the M bits of the log memory by placing each in a first state; and
   (c) in response to a referencing by the microcode-processor to corresponding microcode, setting the corresponding log memory bit to a second state to indicate that the microcode of its corresponding microstore location has been referenced by the microcode-processor;
   wherein:
   said microcode-processor includes an execution unit in a first computer and a pipeline for supplying microcode data words to the execution unit, said first computer having a system clock for synchronizing operations of the first computer, said pipeline having means for selectively invalidating one or more of the supplied microcode data words, said execution unit having means for selectively consuming only valid ones of the supplied microcode data words, said consumption constituting a reference by the microcode processor to the valid microcode data words;

the microstore receives microcode address words and supplies corresponding microcode data words from addressed ones of its M memory locations to a head-end of the pipeline for possible later consumption by the execution unit;

the microcode data words are shifted into the pipeline head-end in synchronism with the system clock of the first computer;

each microcode data word is accompanied by a pipeline-alterable valid bit as the microcode data word shifts through and is processed in the pipeline, upon emergence from a tail-end of the pipeline, each pipeline-processed microcode data word continues to have an associated, pipeline-processed valid bit, the state of the pipeline-processed valid bit indicating whether the associated microcode data word is or is not consumable by the execution unit; and the reference logging method further comprises:
  linking each microcode address word to the valid bit of its corresponding pipeline-processed microcode data word as the valid bit shifts through the pipeline; and
  discriminating between pipeline-processed microcode address words that are each linked to a pipeline-processed valid bit having a true final pipeline-processed state which indicates the corresponding pipeline-processed microcode data word is consumable by the execution unit and pipeline-processed microcode address words that are each linked to a pipeline-processed valid bit having a false final pipeline-processed state which indicates the corresponding pipeline-processed microcode data word is not consumable by the execution unit.

4. A reference logging method according to claim 3, further comprising:
  passing the microcode address words through said pipeline and outputting from the pipeline corresponding pipelined microcode address words;
  supplying the log memory with the pipelined microcode address words output from the pipeline, each pipelined microcode address word being logically linked to its corresponding pipeline-processed valid bit; and
  in the setting step, defining the microcode of a microstore location as having been referenced if the pipeline-processed valid bit of the pipelined microcode address word received by the log memory has a true final pipeline-processed state.

5. A reference logging structure comprising:
a readable microstore for storing a predefined number, M, of microcode data words, the microstore having an address input port and a data output port, said microstore data output port being operatively coupled to supply the microcode data words to a microcode processor;
a system clock generator for producing system clock signals, the system clock generator responding to received stop commands by halting the production of system clock signals and responding to received start commands by starting the production of system clock signals;
a first scannable register, operatively coupled to the microstore and the system clock generator, for supplying first address signals to the microstore address input port in pace with the system clock signals;
a readable and writable log memory for storing a predefined number, M, of microstore reference codes, the log memory having an address input port coupled to receive second address signals, that are derived from the first address signals, the log memory further having a data input port and a data output port;
a second scannable register for storing one or more microstore tag codes and supplying the stored tag codes to the data input port of the log memory; and
scan means for issuing a stop command to the system clock generator, loading a predefined micro-routine start address into the first scannable register while clocks are halted, loading a predefined tag code into the second scannable register while clocks are halted, and issuing a start command to the system clock generator thereafter;
wherein a tag code stored in the second scannable register is written into a memory location of the log memory if microcode of a corresponding memory location of the microstore is referenced by said microcode processor; said reference logging structure further comprising:
a third scannable register for storing one or more second address signals;
comparing means, operatively coupled to the system clock generator and to the first and third scannable registers, for comparing said first address signals against said second address signals and outputting a stop clock command when a prespecified comparison condition is met, said stop clock command being for stopping the system clock signals upon the occurrence of said condition; and
compare enabling means, operatively coupled to the comparing means, for selectively enabling or disabling the output of said stop clock command;
and wherein the scan means further comprises:
compare control means, operatively coupled to the compare enabling means, for transmitting control signals to the compare enabling means when system clocks are halted to thereby selectively enable or disable the comparing means;
log memory clearing means for filling the locations of the log memory with a clear code; and
clear bypass means for selectively bypassing the clearing operation of the clearing means.

6. A reference logging structure comprising:
a readable microstore for storing a predefined number, M, of microcode data words, the microstore having an address input port and a data output port, said microstore data output port being operatively coupled to supply the microcode data words to a microcode processor;
a system clock generator for producing system clock signals, the system clock generator responding to received stop commands by halting the production of system clock signals and responding to received start commands by starting the production of system clock signals;

a first scannable register, operatively coupled to the microstore and the system clock generator, for supplying first address signals to the microstore address input port in pace with the system clock signals;

a readable and writable log memory for storing a predefined number, M, of microstore reference codes, the log memory having an address input port coupled to receive second address signals, that are derived from the first address signals, the log memory further having a data input port and a data output port;

a second scannable register for storing one or more microstore tag codes and supplying the stored tag codes to the data input port of the log memory; and scan means for issuing a stop command to the system clock generator, loading a predefined micro-routine start address into the first scannable register while clocks are halted, loading a predefined tag code into the second scannable register while clocks are halted, and issuing a start command to the system clock generator thereafter;

wherein a tag code stored in the second scannable register is written into a memory location of the log memory if microcode of a corresponding memory location of the microstore is referenced by said microcode processor;

said reference logging structure further comprising a pipeline having:

a head-end operatively coupled to the first scannable register for receiving the first address signals and to the microstore data output port for receiving corresponding microcode data words, stages for shifting therethrough the received first address signals and the corresponding microcode data words in synchronism with the system clock signals, and a tail-end for outputting shifted through ones of the first address signals, wherein the pipeline stages further shift one or more valid bits in unison with each first address signal indicating a pipeline processing state of the corresponding microcode data word as it passes through the pipeline and the pipeline tail-end outputs one or more pipeline-processed valid bits indicating a corresponding post-pipeline valid or invalid state of the corresponding one or more pipeline-processed microcode data words; and wherein the one or more pipeline-processed valid bits determine whether one or none of the one or more tag codes in the tag register will be written into the log memory location addressed by the corresponding shifted through ones of the first address signals.

7. A reference logging structure comprising:

a readable microstore for storing a predefined number, M, of microcode data words, the microstore having an address input port and a data output port, said microstore data output port being operatively coupled to supply the microcode data words to a microcode processor;

a system clock generator for producing system clock signals, the system clock generator responding to received stop commands by halting the production of system clock signals and responding to received start commands by starting the production of system clock signals;

a first scannable register, operatively coupled to the microstore and the system clock generator, for supplying first address signals to the microstore address input port in pace with the system clock signals;

a readable and writable log memory for storing a predefined number, M, of microstore reference codes, the log memory having an address input port coupled to receive second address signals, that are derived from the first address signals, the log memory further having a data input port and a data output port;

a second scannable register for storing one or more microstore tag codes and supplying the stored tag codes to the data input port of the log memory; and scan means for issuing a stop command to the system clock generator, loading a predefined micro-routine start address into the first scannable register while clocks are halted, loading a predefined tag code into the second scannable register while clocks are halted, and issuing a start command to the system clock generator thereafter;

wherein a tag code stored in the second scannable register is written into a memory location of the log memory if microcode of a corresponding memory location of the microstore is referenced by said microcode processor;

wherein the scan means further comprises:

log memory clearing means for filling the locations of the log memory with a clear code;

clear bypass means for selectively bypassing the clearing operation of the clearing means; and tag code altering means for altering the one or more tag codes stored in the tag register.

* * * * *